(12) United States Patent
Tanaka

(10) Patent No.: US 8,033,851 B2
(45) Date of Patent: Oct. 11, 2011

(54) CONNECTOR, BOARD HAVING THE SAME, AND ELECTRONIC DEVICE HAVING THE SAME

(75) Inventor: Hiroyuki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/967,376

(22) Filed: Dec. 14, 2010

(65) Prior Publication Data
US 2011/0081792 A1   Apr. 7, 2011

Related U.S. Application Data

(63) Continuation of application No. PCT/JP2008/061836, filed on Jun. 30, 2008.

(51) Int. Cl.
*H01R 13/64* (2006.01)
(52) U.S. Cl. ...................................................... 439/248
(58) Field of Classification Search .................. 439/248, 439/247, 384, 382
See application file for complete search history.

(56) References Cited

U.S. PATENT DOCUMENTS

| | | | | |
|---|---|---|---|---|
| 5,201,663 A | * | 4/1993 | Kikuchi et al. | 439/83 |
| 5,755,584 A | * | 5/1998 | Kodama et al. | 439/248 |
| 6,019,613 A | * | 2/2000 | Kataoka et al. | 439/83 |
| 6,457,980 B2 | * | 10/2002 | Hattori et al. | 439/74 |
| 6,773,283 B2 | * | 8/2004 | Yoshimatsu et al. | 439/180 |
| 6,939,154 B2 | | 9/2005 | Horikoshi et al. | |
| 7,530,830 B1 | * | 5/2009 | Lenox | 439/248 |
| 2005/0048824 A1 | | 3/2005 | Horikoshi et al. | |
| 2009/0215303 A1 | * | 8/2009 | Barringer et al. | 439/352 |

FOREIGN PATENT DOCUMENTS

| | | |
|---|---|---|
| JP | 3-7273 | 1/1991 |
| JP | 5-31158 | 4/1993 |
| JP | 2004-71356 | 3/2004 |
| JP | 2006-338970 | 12/2006 |

OTHER PUBLICATIONS

International Search Report mailed Sep. 2, 2008 for International Application No. PCT/JP2008/061836.

* cited by examiner

*Primary Examiner* — Phuong Dinh
(74) *Attorney, Agent, or Firm* — Fujitsu Patent Center

(57) ABSTRACT

A connector includes: a signal pin provided at a front end thereof with a terminal contacting a terminal provided in an electronic component, and electrically conducting a board with the electronic component; and a housing the signal pin, wherein the housing includes: a front end member within which the signal pin is secured, and connected to a connector provided in the electronic component; a rear end member secured in the board; and an elastic member arranged between the front end member and the rear end member, and having a block shape.

10 Claims, 17 Drawing Sheets

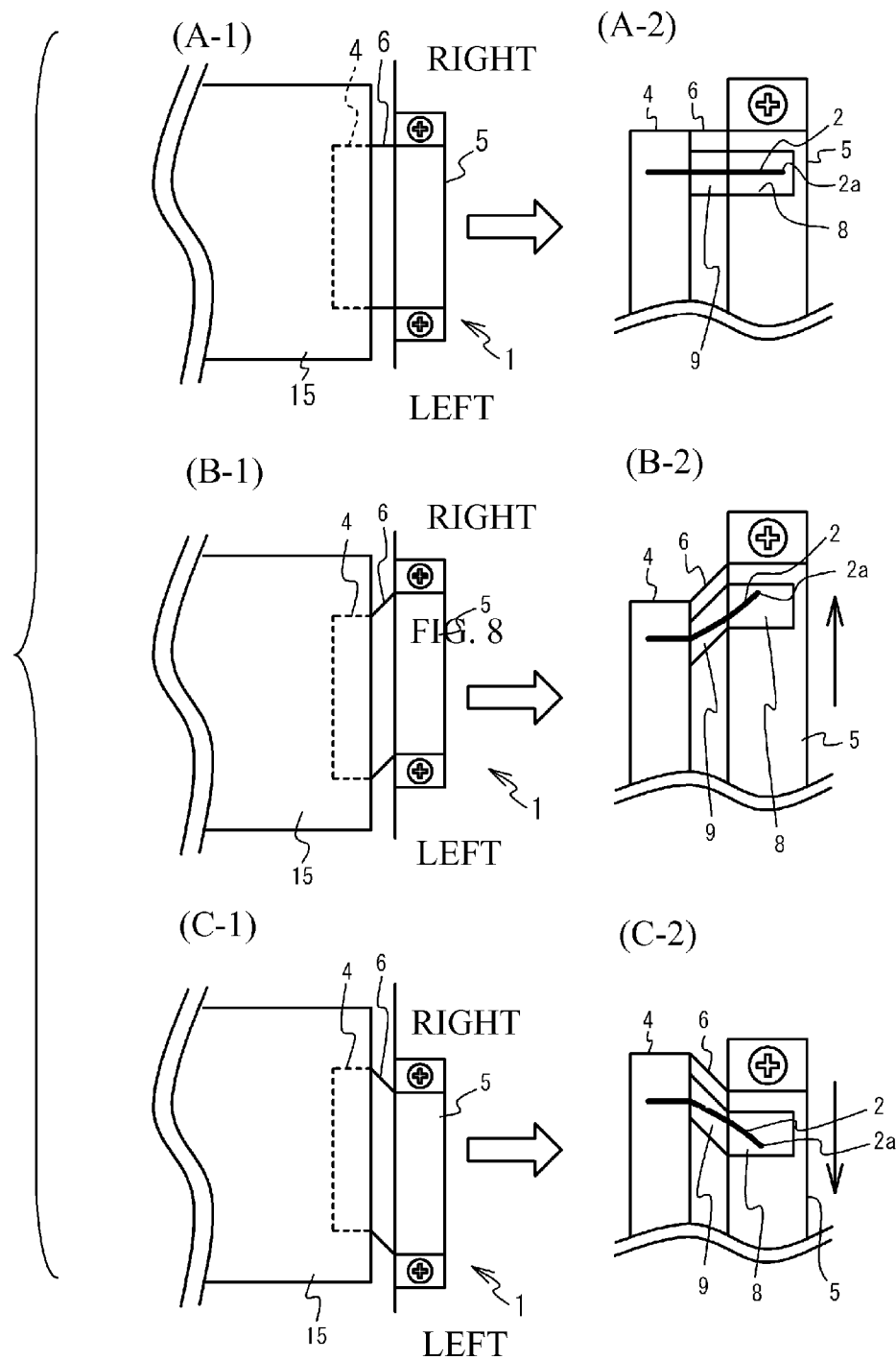

CONNECTOR, BOARD HAVING THE SAME, AND ELECTRONIC DEVICE HAVING THE SAME

CROSS-REFERENCE TO RELATED APPLICATION

This application is a continuation application of International Patent Application No. PCT/JP2008/061836, filed on Jun. 30, 2008, the entire contents of which are incorporated herein by reference.

FIELD

The embodiment discussed herein is related to a connector, a board having the same, and an electronic device having the same.

BACKGROUND

Conventionally, a connector ensures connection between a board provided in an electronic device such as a notebook computer and an electronic component attachable and detachable to and from the board. The general type of the attachable/detachable electronic component is a storage device such as an Optical Disc Drive (ODD) or a Hard Disc Drive (HDD). A housing of such a connector includes one end portion located in the storage device and a rear end portion located in the board. One end and rear end portions are integrally formed with each other. Then, a signal pin housed in the housing is secured within the housing by plastic molding.

The signal pin is inserted and soldered on the board, and the rear end portion is secured by screws, thereby attaching such a connector on the board. The board might vibrate. The vibration of the board is caused by the use of a speaker installed within the electronic device or by the falling of the electronic device. The vibration of the board is transmitted to the storage device through the connector.

The ODD and HDD each includes: a rotational mechanism for rotating a disk (storage medium) storing data; and a head accessing the rotating disk. The vibration transmitted from the board to the ODD or HDD causes the head to vibrate. Further, the vibration transmitted from the board to the ODD or HDD might cause a contact failure between a terminal of the connector and a terminal of the ODD or HDD. The vibration of the head or the contact failure between these terminals might cause an error in reading or writing data.

There are known a following connector which absorbs the transmission of the vibration from a chassis to the HDD via the connector at the time the dropping impact is applied to the chassis of the notebook computer. For example, there is a connector including an elastic member supporting a first connector portion on a second connector portion with the first and second connector portions separated from each other. In such an example of the connector, an upper connector is used as the first connector portion, and a lower connector is used as the second connector portion. Additionally, an electrical connecting pin is used as the elastic member. This electrical connecting pin is made of a metallic material having a plate shape. The plate-shaped metallic material configured as the electrical connecting pin includes a bending portion bent in the thickness direction thereof, and the bending portion functions as an elastically deformable portion (see Japanese Unexamined Patent application publication No. 2004-71356).

Further, there is known an electrical connector including a plastic member, as the conventional technique. For example, there is known an electrical connector where a viscoelastic member with plastic properties is arranged at a clearance defined between a connector housing and a fixing frame supporting the connector housing (see Japanese Unexamined utility model application publication No. 5-31158).

The vibration of the board provided in the electronic device might be caused by various reasons. For example, in the notebook computer as an example of the electronic device, its chassis houses a speaker. The use of this speaker might cause the vibration of the board. The vibration caused by the use of the speaker might include the rightward, leftward, forward, and rearward components, in addition to the upward and downward components. In such a way, the vibration occurring on the board might include the component other than the upward and downward components.

Correspondingly, it is conceivably difficult for the connector including the elastic member supporting the first connector portion on the second connector portion to effectively absorb and attenuate the impact or vibration in a direction other than the upward and downward directions. As mentioned above, the bending portion bent in the thickness direction is formed in the plate-shaped metallic material embodied as the electrical connecting pin corresponding to the elastic member. The elastic member with such a shape has the primary purpose of absorbing and restricting of the impact and the vibration in the upward and downward directions.

For this reason, in a case where the conventional connector as mentioned above is employed, the rightward, leftward, forward and rearward vibrations might be transmitted to the ODD or HDD. Further, the vibration is transmitted to the ODD or HDD, so that the contact failure might be caused in a terminal of the ODD or HDD. This might result in an error in reading or writing data.

Furthermore, the electrical connector, where the viscoelastic member with plastic properties is arranged the clearance defined between the connector housing and the fixing frame supporting the connector housing, has the purpose of facilitating the fitting operation of the connector. This electrical connector has a self-correcting mechanism of the fitting angle between the female and male connectors connected. That is, it is not assumed that this electrical connector absorbs the vibration of the board.

Moreover, this electrical connector is supposed to be attached to an end of a harness. That is, it is not assumed that the signal pin is directly inserted into the board and is then soldered. It is difficult for this connector to correspond to be applicable to the conformation in which the signal pin are directly inserted into the board

SUMMARY

According to an aspect of the embodiments, a connector discussed herein includes: a signal pin electrically conducting a terminal provided in an electronic component and a board; and a housing housing the signal pin. The signal pin is provided at a front end thereof with a terminal. The housing includes: a front end member within which the signal pin is secured, and connected to a connector provided in the electronic component; and a rear end member secured in the board. An elastic member is arranged between the front end member and the rear end member, and has a block shape.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8(A-1), 8(B-1), and 8(C-1) are explanatory views of the connector when the board vibrates rightwardly and leftwardly; and FIG. 8(A-2), 8(B-2), and 8(C-2) are explanatory views of the connector when the signal pin vibrates rightwardly and leftwardly;

DESCRIPTION OF EMBODIMENTS

In the following, a preferable embodiment will be described with reference to drawings.

Figure 1:
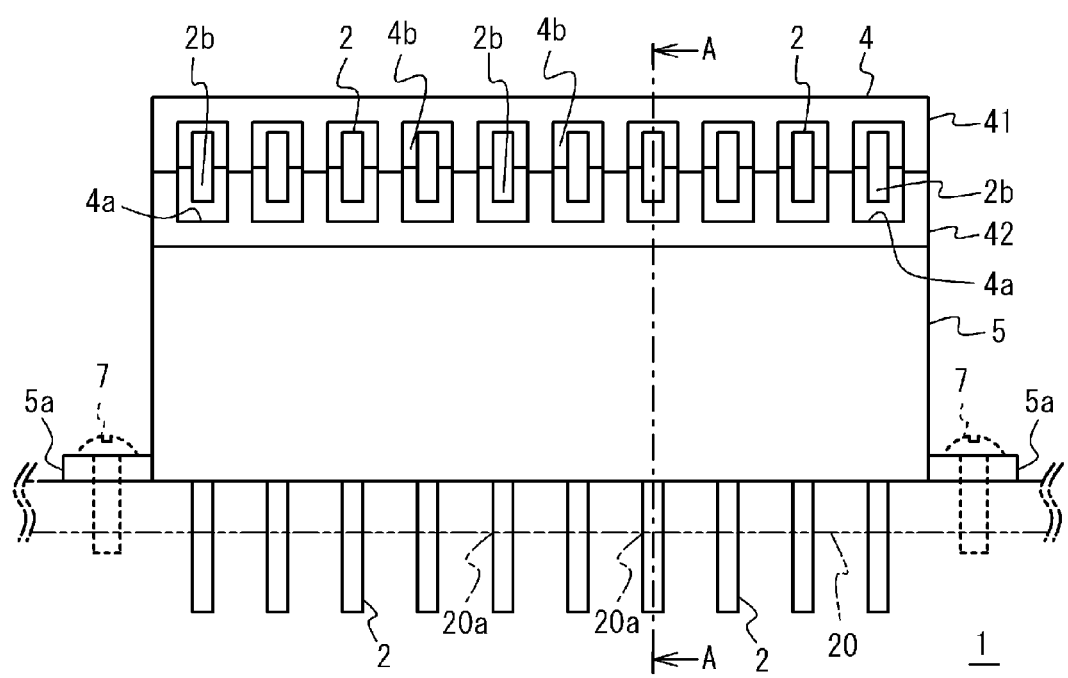
FIG. 1 is a front view of a connector according to an embodiment.
Figure 2:
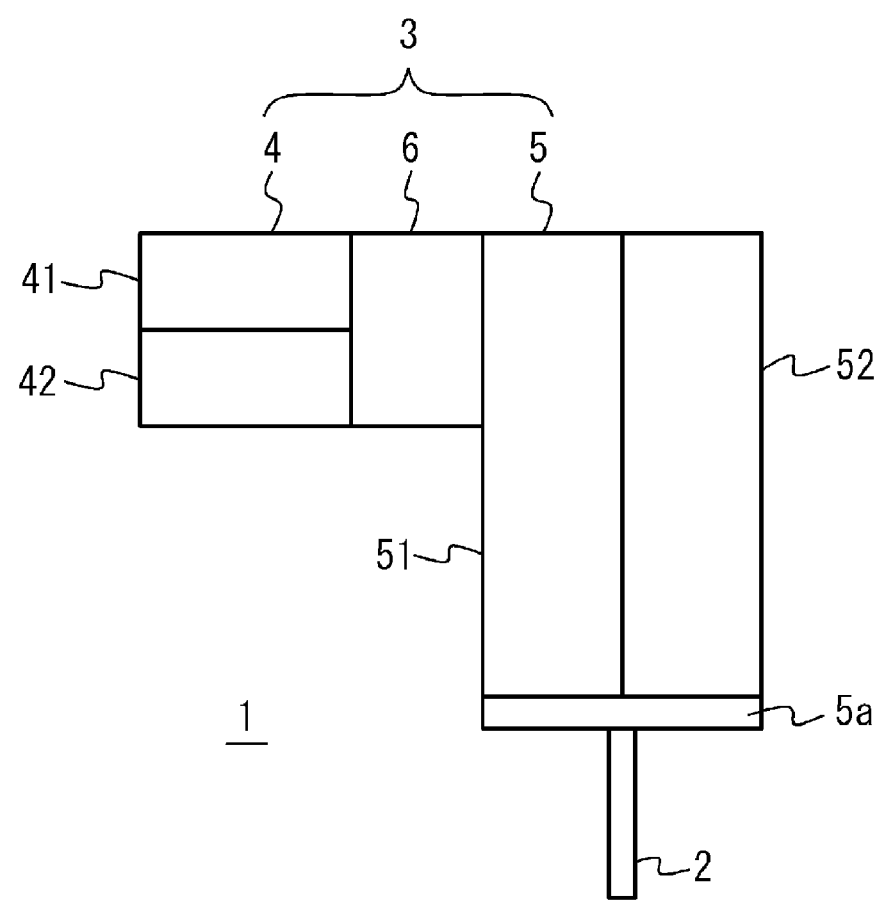
FIG. 2 is a side view of the connector according to the embodiment.
Figure 3:
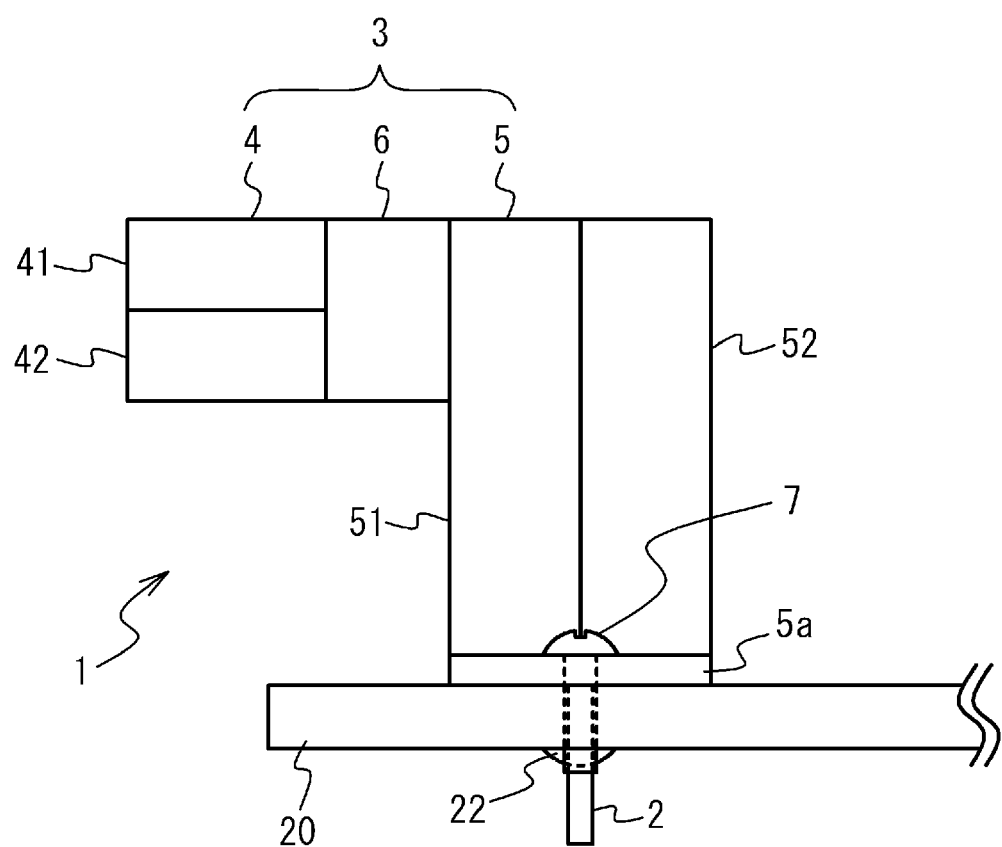
FIG. 3 is a side view of a board secured with the connector according to the embodiment.

FIG. 1 is a front view of a connector 1 according to an embodiment. FIG. 2 is a side view of the connector 1. FIG. 3 is a side view of a board 20 on which the connector 1 is mounted. Further, FIG. 4 is a cross-sectional view taken along line A-A of FIG. 1.

The connector 1 includes ten signal pins made of a metal and a housing 3 housing the signal pins 2. The housing 3 includes: a front end member 4; a rear end member 5; and an elastic member 6 having a block shape and arranged between the front end member 4 and the rear end member 5.

The front end member 4 and the elastic member 6 are arranged in series with each other. Further, the rear end member 5 is arranged in a direction perpendicular to the series direction in which the front end member 4 and the elastic member 6 are arranged. Therefore, the side shape of the housing 3 is an L shape, as illustrated in FIG. 2. Each signal pin 2 is bent to correspond to the side shape of the housing 3. A bending portion 2a of the signal pin 2 is positioned within the rear end member 5. Each signal pin 2 has a terminal 2b at its end. The signal pin 2 is bent to form the terminal 2b.

Figure 4:
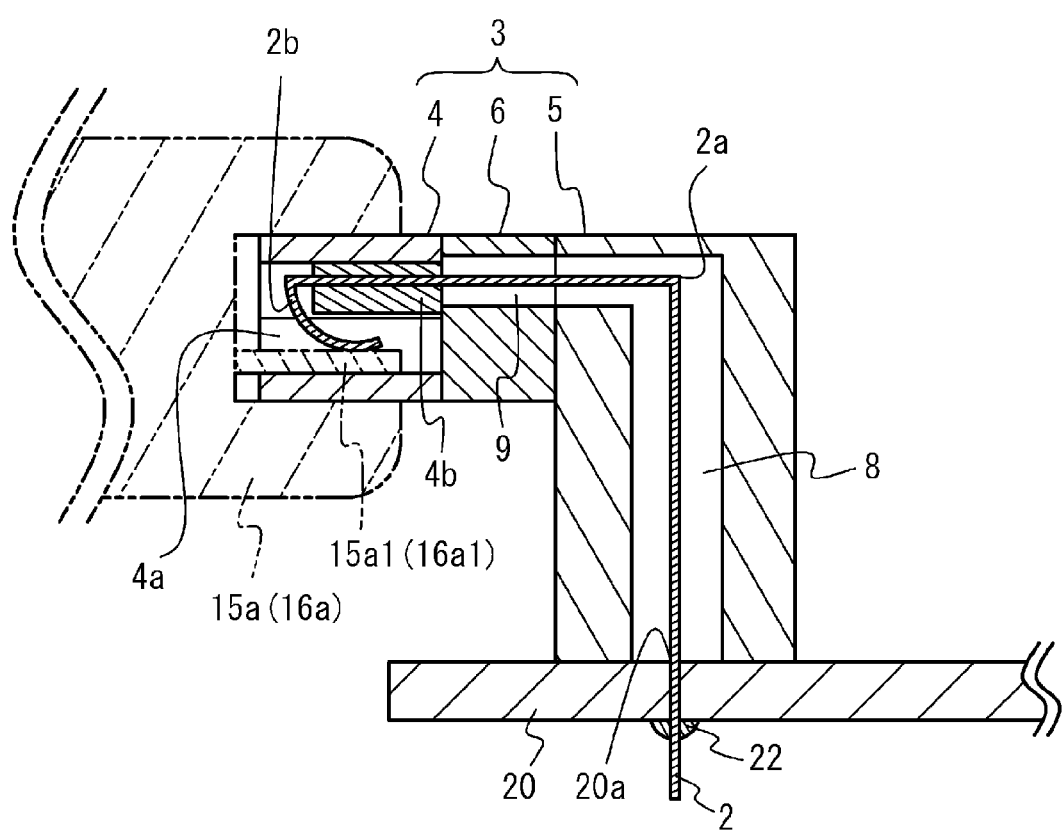
FIG. 4 is a cross-sectional view taken along A-A line of FIG. 1.
Figure 5:
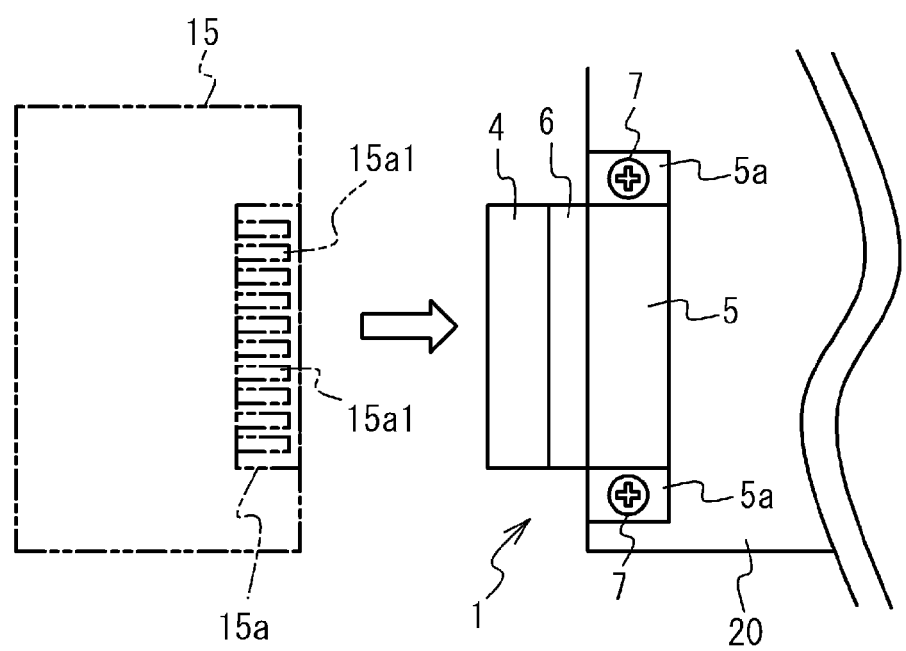
FIG. 5 is an explanatory view of the connector, according to the embodiment, secured on the board.

The rear end member 5 stands and is secured on one surface of the board 20, as illustrated in FIG. 4. In this case, the signal pin 2 is inserted into an attachment hole 20a and is soldered with the other surface of the board 20. Further, the rear end member 5 includes flange portions 5a for being secured on the board 20. The flange portions 5a are secured on the board 20 with screws. Thus, the connector 1 is attached in the board 20.

Figure 6:
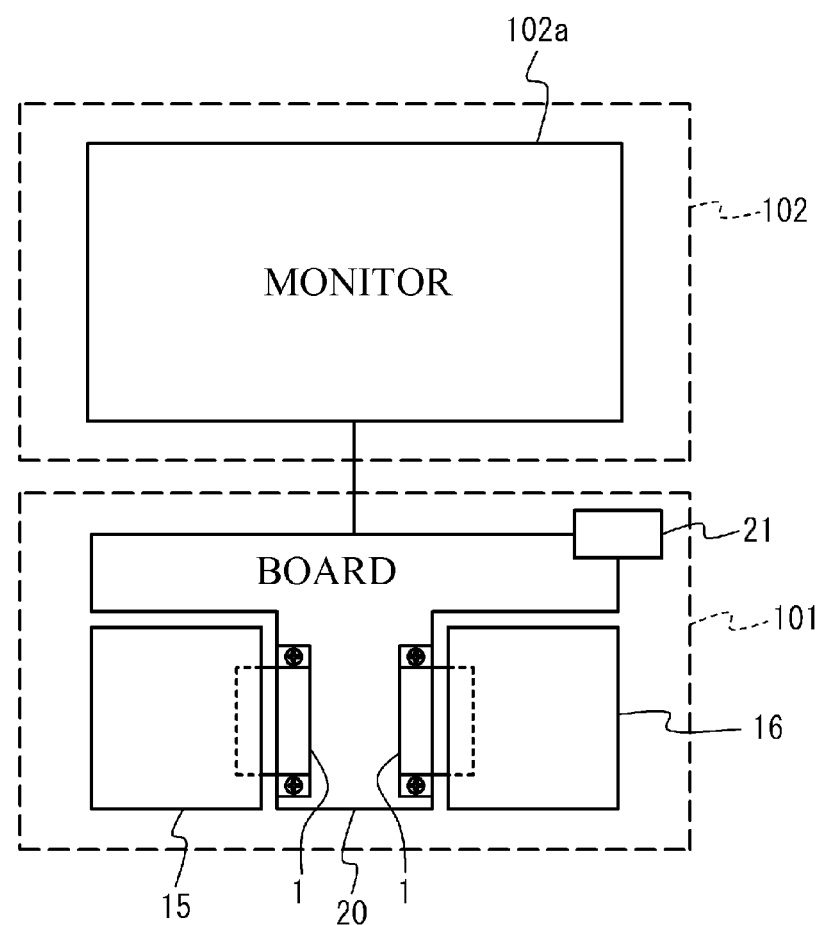
FIG. 6 is a schematic view of a notebook computer provided with the connector according to the embodiment.

FIG. 6 is a schematic view of a notebook computer 100 as an example of an electronic device. The notebook computer 100 includes a main chassis 101 and a display chassis 102. A monitor 102a is installed in the display chassis 102. The board 20 is arranged within the main chassis 101. A speaker 21 is connected to the board 20. Further, an ODD (Optical Disc Drive) 15 and a HDD (Hard Disc Drive) 16 are arranged within the main chassis 101. The ODD 15 and the HDD 16 are attached in the main chassis 101. The display chassis 102 is connected to the main chassis 101 so as to be openable and closable by means of hinges not illustrated.

The connector 1 is used to connect the ODD 15 and the board 20, as illustrated in FIG. 6. In this case, the front end member 4 is connected to a connector 15a provided in the ODD 15. Also, the connector 1 is used to connect the HDD 16 and the board 20. In this case, the front end member 4 is connected to a connector 16a provided in the HDD 16.

Therefore, the terminal 2b of the signal pin 2 contacts a terminal 15a1 provided in the ODD 15 to electrically conduct the ODD 15 with the board 20. Further, the terminal 2b of the signal pin 2, a terminal 16a1 of the HDD 16, and the board 20 come into contact with each other to electrically conduct the HDD 16 with the board 20. The number of the signal pins 2 provided corresponds to the number of the terminals 15a1 of the ODD 15 and the number of the terminals 16a1 of the HDD 16.

The front end member 4 is made of a resin and includes a space 4a in its inside. The space 4a is defined by every signal pin 2. Additionally, the terminal 2b is housed within the space 4a. Further, a resin filled layer 4b is provided within the space 4a. The resin filled layer 4b is provided by filling the space 4a with a resin. The signal pin 2 is buried by the filling resin to be secured within the front end member 4.

The rear end member 5 is made of a resin. The rear end member 5 is provided with flange portions 5a at a lower portion of its side walls, respectively. As mentioned above, the flange portions 5a are secured on the board 20 with the screws 7. As illustrated in FIG. 4, the rear end member 5 is provided with spaces 8 in its inside. The signal pin 2 can freely move within the space 8. The space 8 includes: a first section extending in a direction intersecting the front surface of the board 20, and a second section being continuous with the first section and extending parallel with the front surface of the board 20. The space 8 is provided for each signal pin 2. The bending portion 2a is positioned within the space 8. The space 8 is provided so as not to restrict the relative movement and the bending deformation of the signal pin 2 at the time the rear end member 5 is moved by the vibration of the board 20. When the board 20 vibrates, the elastic member 6 is elastically deformed and the rear end member 5 secured on the board 20 moves relative to the front end member 4. On the other hand, the signal pin 2 is soldered with the board 20 and is secured at the front end member 4. Thus, when the rear end member 5 moves relative to the front end member 4, the signal pin 2 moves relative to the rear end member 5. In this case, the bending deformation is developed. The space 8 permits such a relative movement and such a bending deformation of the signal pin 2.

The elastic member 6 is made of a rubber material as an example of a elastic material. The elastic member 6 has a block shape and can be elastically deformed. Specifically, the elastic member 6 can be deformed in compression deformation, extension deformation, bending deformation, twisting deformation, and a combination thereof. This permits the rear end member 5 to move relative to the front end member 4 upwardly, downwardly, rightwardly, leftwardly, forwardly, and rearwardly. As illustrated in FIG. 4, a space 9 is defined within the elastic member 6 and the signal pin 2 freely moves within the space 9. The space 9 is continuous with the second section of the space 9 of the rear end member 5 and extends in the same direction in which the second section of the space 9 extends. The space 9 is provided for each signal pin 2. The liner portion of the signal pin 2 is arranged within the space 9. The space 9 is provided so as not to restrict the relative movement and the bending deformation of the signal pin 2 at the time the rear end member 5 is moved by the vibration of the board 20. As mentioned above, when the rear end member 5 moves relative to the front end member 4, the elastic member 6 is deformed. Further, the signal pin 2 itself moves with being bent and deformed. Accordingly, the signal pin 2 moves relative to the elastic member 6. The space 9 permits such a relative movement and such a bending deformation of the signal pin 2.

Additionally, since the elastic member 6 is made of a rubber material, the elastic member 6 is deformed by the contact with the signal pin 2. This permits the relative movement of the signal pin 2. For this reason, the space 9 may not be provided. However, the provision of the space 9 permits the signal pin 2 to broadly move.

The elastic member 6 may be made of a silicon material instead of a rubber material. Alternatively, a sponge material may be used instead of a rubber material.

Next, a description will be given of a manner of absorbing vibration in the connector 1, with reference to FIGS. 7 to 10. Additionally, the movements of the components illustrated in each drawing are more exaggerated than in reality.

Figure 7A:
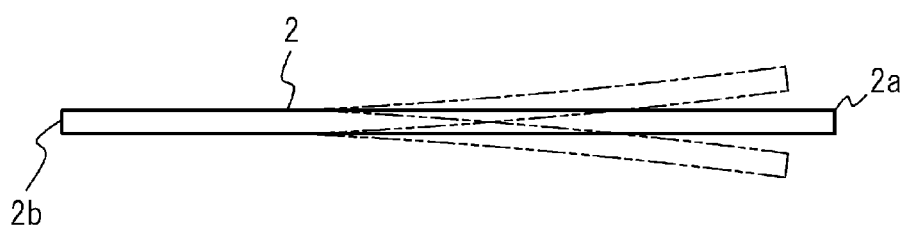
FIGS. 7A and 7B are explanatory views of the movement of a signal pin when the board vibrates.
Figure 7B:
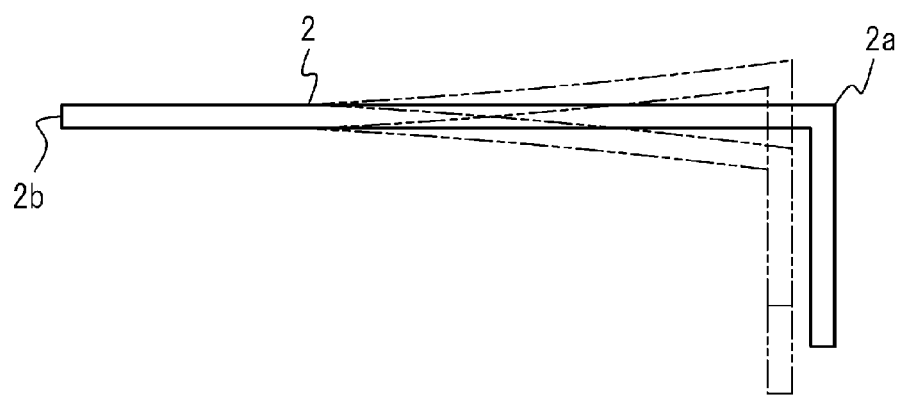

First, a description will be given of the movement of the signal pin 2 at the time the board 20 vibrates, with reference to FIG. 7. FIG. 7A is a view of the movement of the signal pin 2 when viewed from its upper. FIG. 7B is a view of the movement of the signal pin 2 when viewed from its side. As illustrated in FIG. 7A, the side of the bending portion 2a can move rightwardly and leftwardly. Further, as illustrated in FIG. 7B, the side of the bending portion 2a can move upwardly and downwardly. Moreover, the bending portion 2a can move forwardly and rearwardly. When the side of the bending portion 2a moves, the signal pin 2 is bent. Such a movement of the signal pin 2 in the connector 1 is permitted by the space 8 provided within the rear end member 5 and the space 9 provided within the elastic member 6, as described above. On the other hand, the side of the terminal 2b is secured within the front end member 4, thereby restricting the movement of the terminal 2b.

Next, a description will be given of the principle of absorbing the vibration in the connector 1 with reference to the movement of the signal pin 2. Herein, a description will be given of the absorbing of the vibration in a connecting portion between the board 20 and the ODD 15. This absorbing of the vibration is similar to that in a connecting portion between the board 20 and the HDD 16.

FIGS. 8(A-1) to 8(C-2) are explanatory views of the manner where the rightward and leftward vibration of the board 20 secured with the rear end member 5 is absorbed.

FIG. 8(A-1) schematically illustrates the connector 1 viewed from its upper side when the board 20 does not vibrate. FIG. 8(A-2) schematically illustrates the signal pin 2 when the board 20 does not vibrate. When the board 20 does not vibrate, the rear end member 5 does not vibrate. Also, the signal pin 2 does not move.

FIG. 8(B-1) schematically illustrates the connector 1 viewed from its upper side when the board 20 vibrates rightwardly. FIG. 8(B-2) schematically illustrates the signal pin 2 when the board 20 vibrates rightwardly.

FIG. 8(C-1) schematically illustrates the connector 1 viewed from its upper side when the board 20 vibrates leftwardly. FIG. 8(B-2) schematically illustrates the signal pin 2 when the board 20 vibrates leftwardly.

In such a way, when the board 20 vibrates rightwardly and leftwardly, the rear end member 5 secured on the board 20 vibrates leftwardly and rightwardly together with the board 20. In this time, the elastic member 6 is elastically deformed to follow the movement of the rear end member 5.

Figure 9A:
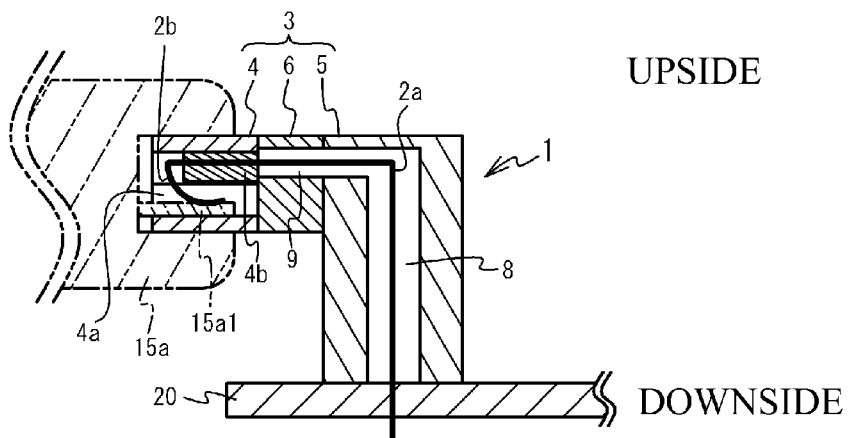
FIGS. 9A, 9B and 9C are explanatory views of the connector when the board vibrates upwardly and downwardly.
Figure 9B:
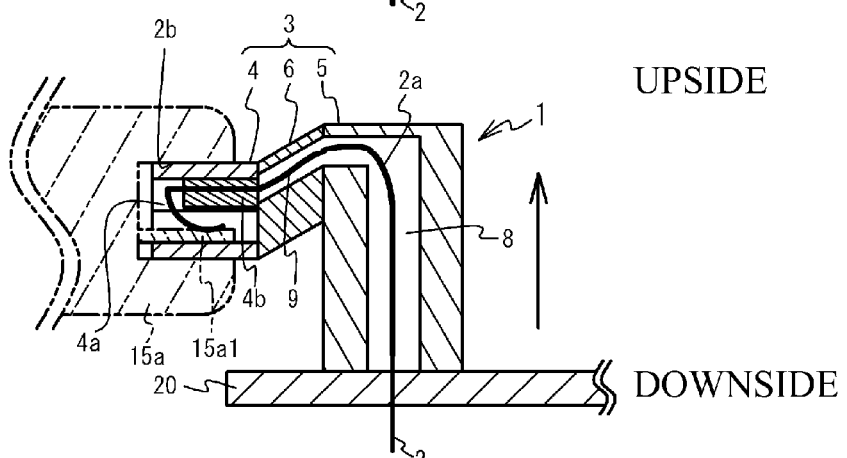
Figure 9C:
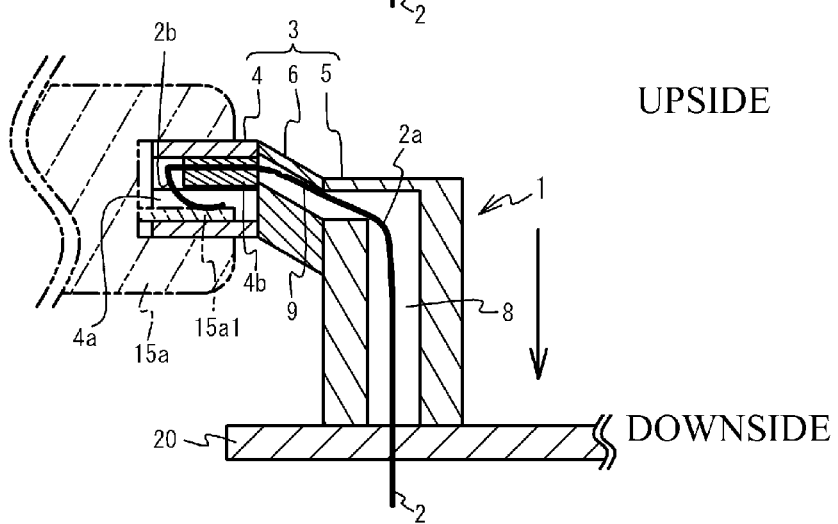

FIGS. 9A to 9C are explanatory views of the manner where the upward and downward vibration of the board 20 secured with the rear end member 5 is absorbed.

FIG. 9A schematically illustrates the connector 1 when viewed from its upper side when the board 20 vibrates leftward. FIG. 9A also illustrates the signal pin 2. When the board 20 does not vibrate, the rear end member 5 does not move. Also, the signal pin 2 does not move.

FIG. 9B schematically illustrates the connector 1 when viewed from its side when the board 20 vibrates upwardly. FIG. 9B also illustrates the signal pin 2.

FIG. 9C schematically illustrates the connector 1 when viewed from its side when the board 20 vibrates downwardly. FIG. 9C also illustrates the signal pin 2.

In this way, when the board 20 vibrates upwardly and downwardly, the rear end member 5 secured on the board 20 vibrates upwardly and downwardly together with the board 20. At this time, the elastic member 6 elastically deforms to follow the movement of the rear end member 5.

Figure 10A:
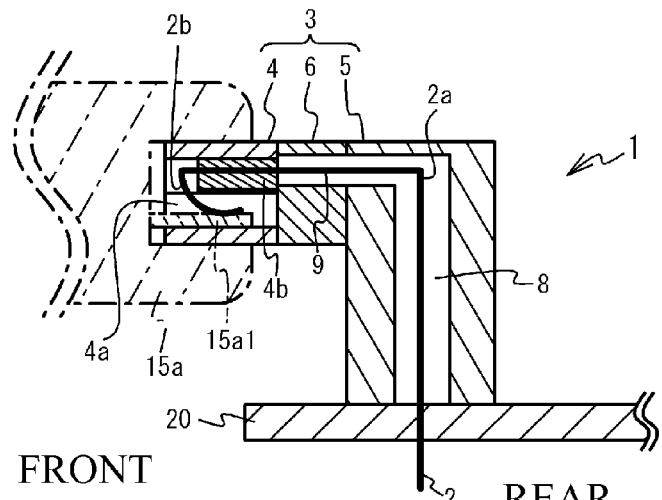
FIGS. 10A, 10B, and 10C are explanatory views of the connector when the board vibrates forwardly and rearwardly.
Figure 10B:
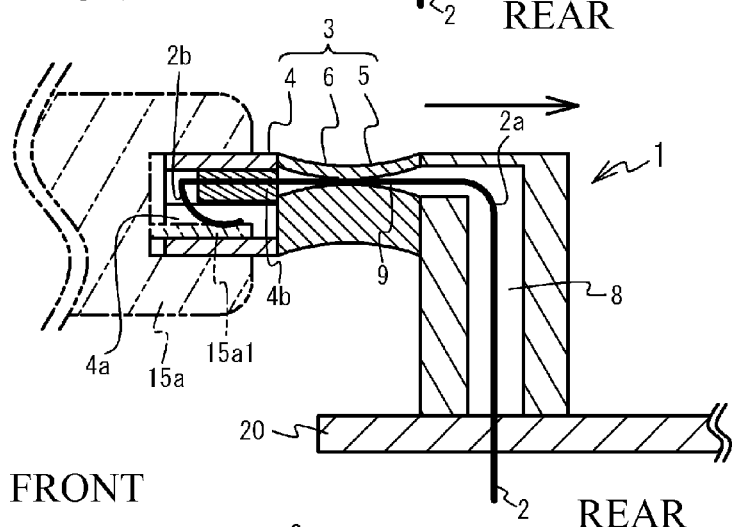
Figure 10C:
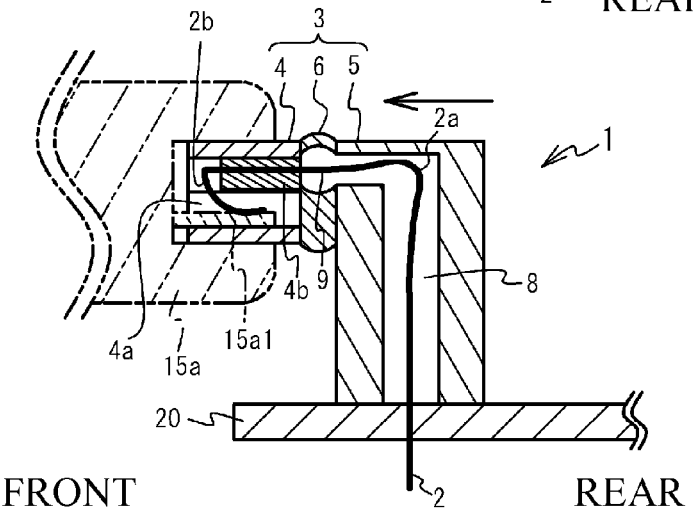

FIGS. 10A to 10C are explanatory views of the manner where the front and rear vibration of the board 20 secured with the rear end member 5 is absorbed.

FIG. 10A schematically illustrates the connector 1 when viewed from its rear side when the board 20 does not vibrate. Also, FIG. 10A illustrates the signal pin 2. When the board 20 does not vibrate, the rear end member 5 does not move. Also, the signal pin 2 does not move.

FIG. 10B schematically illustrates the connector 1 when viewed from its side when the board 20 vibrates rearwardly. FIG. 10B also illustrates the signal pin 2.

FIG. 10C schematically illustrates the connector 1 when viewed from its side when the board 20 vibrates frontwardly. FIG. 10C also illustrates the signal pin 2.

In this way, when the board 20 vibrates forwardly and rearwardly, the rear end member 5 secured on the board 20 vibrates forwardly and rearwardly with the board 20. In this time, the elastic member 6 elastically deforms to follow the movement of the rear end member 5.

As described above, when the board 20 vibrates, the elastic member 6 is elastically deformed so as to follow the movement of the rear end member 5. Thus, the vibration is restricted from being transmitted to the ODD 15. That is, the elastic deformation of the elastic member 6 restricts the movement of the front end member 4 and the vibration of the ODD 15 connected to the front end member 4.

Further, the terminal 2b of the signal pin 2 is secured and the vibration of the ODD 15 is restricted, thereby maintaining the stable conduction between the terminals 15a1 and 2b. This result can restrict an error in reading or writing data in the ODD 15.

Furthermore, the side of the bending portion 2a of the signal pin 2 is permitted to move with the board 20. Moreover, the bending portion 2a is permitted to bend. This can restrict the signal pin 2 from locally receiving a stress. Since the local stress in the signal pin 2 is restricted, damage of the signal pin 2 can be avoided.

Figure 11:
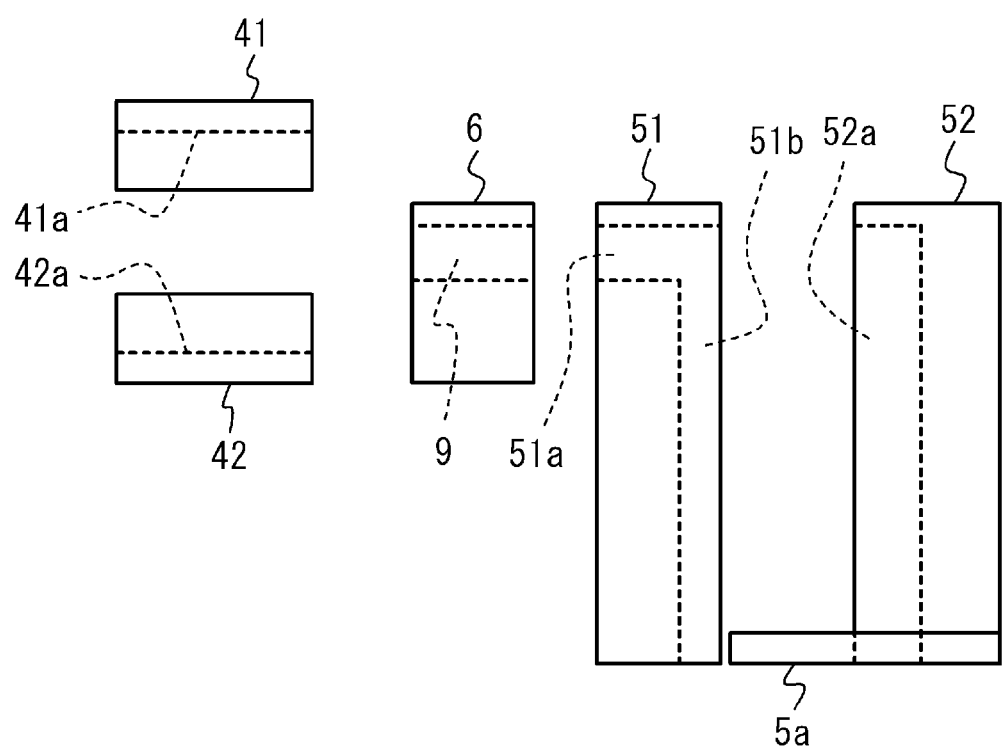
FIG. 11 is an explanatory view of a disassembled housing when viewed from its side.
Figure 12:
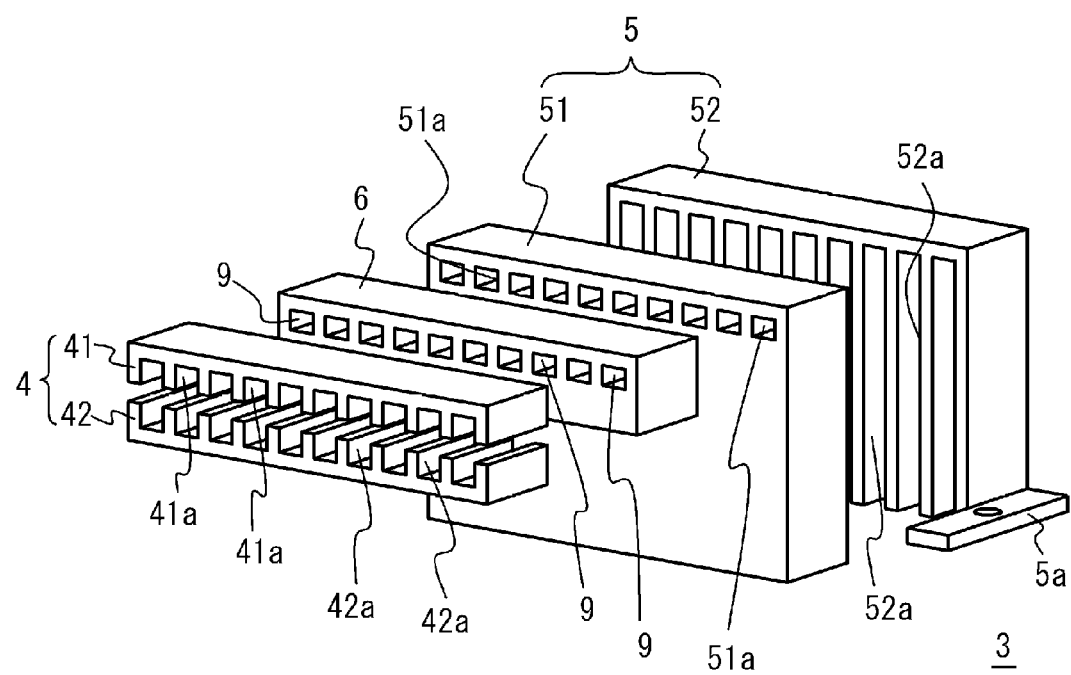
FIG. 12 is a perspective view of the disassembled housing.

Next, the assembling of the connector 1 will be described. FIG. 11 is an explanatory view of the disassembled housing 3 when viewed from its side. Further, FIG. 12 is a perspective view of the disassembled housing 3.

The front end member 4 and the rear end member 5 are provided in the housing 3 of the connector 1. Further, the elastic member 6 having a block shape is provided between the front end member 4 and the rear end member 5. The front end member 4 is divided into an upper member 41 and a lower member 42. Also, the rear end member 5 is divided into a front member 51 and a rear member 52.

The upper member 41 has grooves 41a. The groove 41a is provided for each signal pin 2. The groove 41a is provided with a resin filled layer 4b. The lower member 42 has grooves 42a. The groove 42a is provided for each signal pin 2. The grooves 41a and 42a define the space 4a when the housing 3 is assembled.

Figure 13:
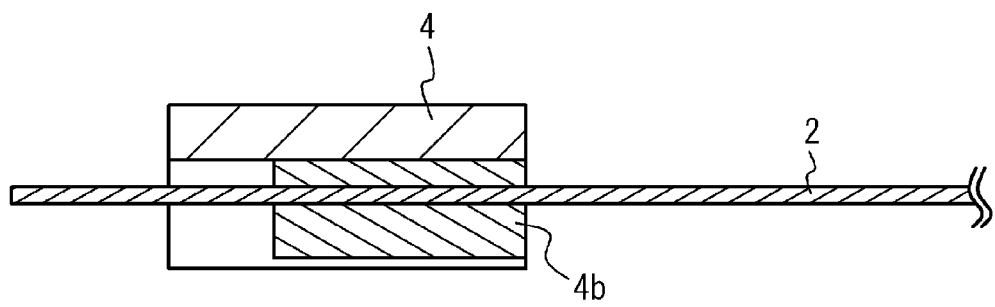
FIG. 13 is a cross-sectional view of an upper member with which a resin is filled and the signal pin is arranged within a groove.

FIG. 13 is a cross-sectional view of the upper member 41 within which the signal pin 2 is arranged and which is filled with the resin. The signal pin 2 is secured on the upper member 41 by the resin filled layer 4b formed within the upper member 41. After this, the end portion of the signal pin 2 is bent to provide the terminal 2b. Additionally, the bending for providing the signal pin 2 may be performed later.

After the signal pin 2 is secured in the upper member 41 with the resin filled layer 4b, the upper member 41 and the lower member 42 are jointed by bonding. Therefore, the front end member 4 is formed.

After the front end member 4 is formed, the elastic member 6 beforehand prepared and the front end member 4 are jointed by bonding. The elastic member 6 is beforehand provided with the space 9 for each signal pin 2. Before the elastic member 6 and the front end member 4 are jointed, first, the signal pin 2 is penetrated though the space 9. Next, the elastic member 6 and the front end member 4 are jointed.

After the jointing of the elastic member 6 with the front end member 4 is accomplished, the front member 51 beforehand prepared and the elastic member 6 are jointed by bonding. The front member 51 is beforehand provided with grooves 51a and grooves 51b respectively continuous with the grooves 51a. The groove 51a is continuous with the space 9 of the elastic member 6. The groove 51b extends in a direction perpendicular to the direction of the groove 51a. The groove 51a defines the space 8 within the rear end member 5 in conjunction with a groove 52a, as will be described later.

To join the elastic member 6 and the front member 51, first, the signal pin 2 is penetrated through the front member 51. Next, the elastic member 6 and the front member 51 are jointed. Additionally, the elastic member 6 and the front end member 4 may be jointed after the elastic member 6 and the front member 51 are jointed.

As mentioned above, the bending portion 2a of the signal pin 2 is formed, after accomplishing the jointing of three members, specifically, the front end member 4, the elastic member 6, and the front member 51. The bending portion 2a is formed by bending the signal pin 2 in the direction toward which the groove 51b extends. That is, the signal pin 2 is bent at the bending portion 2a by 90 degrees.

After the bending portion 2a is formed in the signal pin 2, the rear member 52 beforehand prepared and the front member 51 are jointed by bonding. The rear member 52 is beforehand provided with the grooves 52a. The groove 52a defines the space 8 in conjunction with the groove 51b. Further, the flange portion 5a is continuously provided at the lower edge of the rear member 52.

By jointing the front member 51 with the rear member 52, the rear end member 5 is formed. The space 8 is defined within the rear end member 5, and houses the signal pin 2. By the processes described above, the assembling of the connector 1 housing the signal pin 2 within the housing 3 is accomplished while the space 8 is formed.

Figure 14:
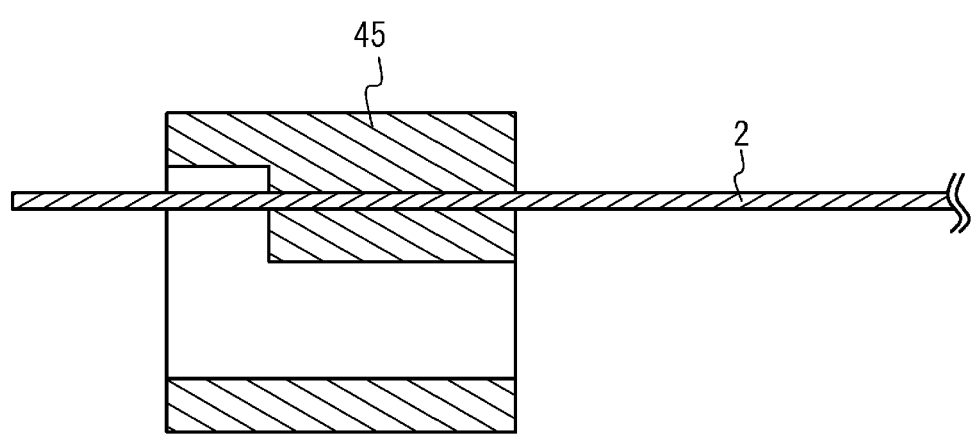
FIG. 14 is a cross-sectional view of another front end member.

Additionally, the front end member 4 can be replaced with a front end member 45 which is fixed with the signal pin 2 and is formed by plastic molding. FIG. 14 is a cross-sectional view of the front end member 45. The signal pin 2 is integrally formed in the front end member 45 from the beginning of the formation and is fixed. For this reason, the front end member 45 does not need the resin filled layer 4b, in contrast to the front end member 4. Further, the front end member 45 is not divided into two members, in contrast to the front end member 4. That is, the entire front end member 45 is formed by plastic molding.

Figure 15:
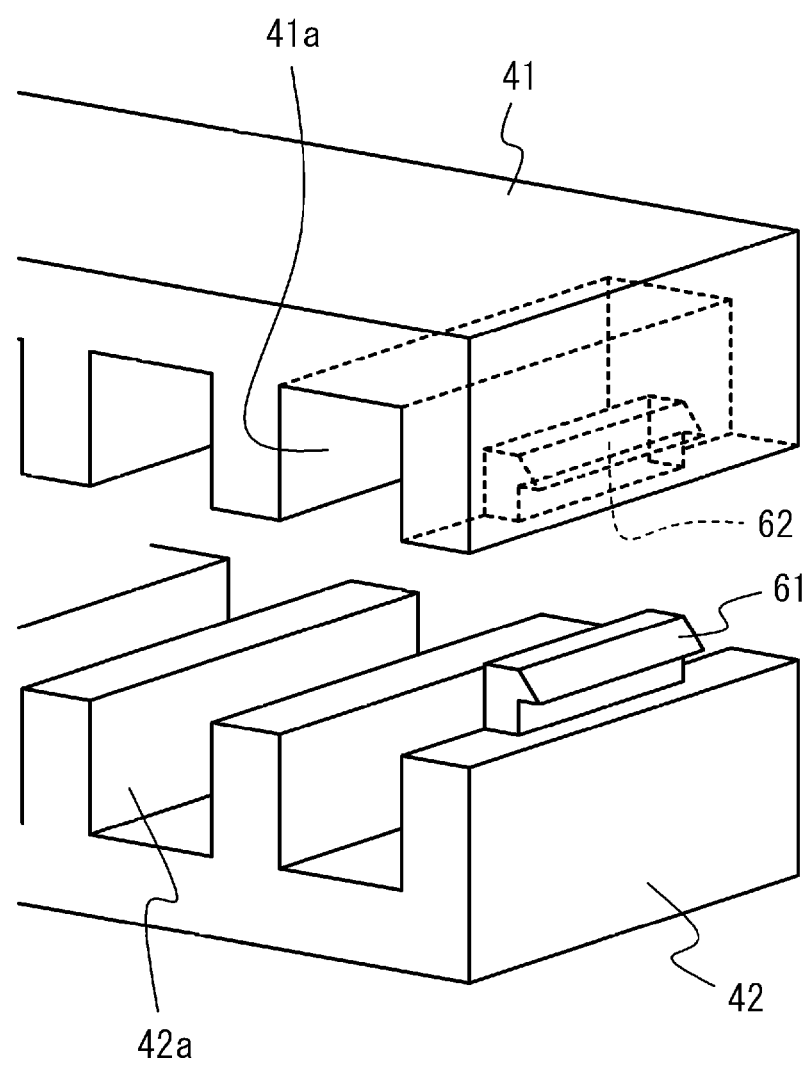
FIG. 15 is an explanatory view of the jointing of a receiving portion provided in the upper member with a pawl portion provided in the lower member.
Figure 16:
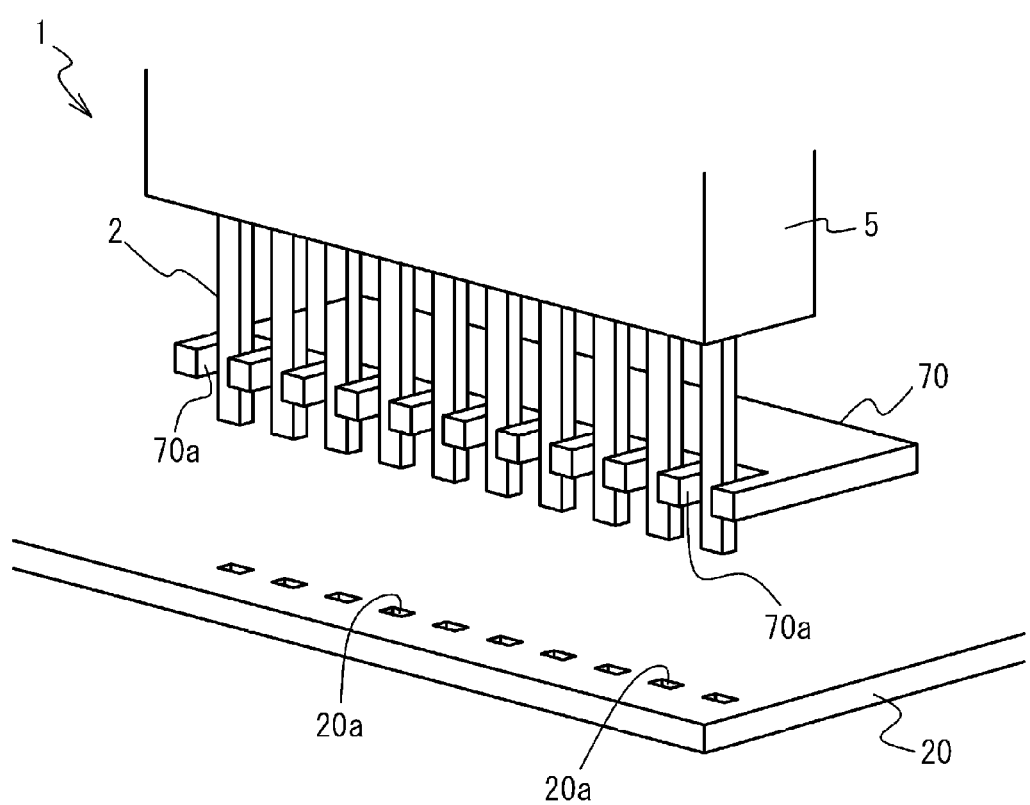
FIG. 16 is an explanatory view of the attachment of the connector to the board by a jig.

Further, in the example mentioned above, the bonding is used for jointing the members. However, other methods may joint the members. For example, the welding joints the members. Moreover, the jointing may be ensured by a claw 61 and a receiving portion 62 fitted onto the claw 61 as illustrated in FIG. 15. FIG. 15 illustrates an example of the receiving portion 62 formed in the upper member 41 defining the front end member 4, and the claw 61 formed in the lower member 42. The upper member 41 and the lower member 42 can be jointed by fitting the claw 61 into the receiving portion 62. Likewise, other members can be jointed.

The flange portions 5a are secured by the screws 7, whereby the connector 1 formed as mentioned above is attached to the board 20. When the connector 1 is attached into the board 20, each of the signal pin 2 is inserted into the attachment hole 20a provided in the board 20. At this time, a jig 70 for positioning the signal pin 2 can be used. The jig 70 has plural grooves 70a and has a comb shape. The signal pin 2 is not secured within the space 8 provided in the rear end member 5. For this reason, the free end of the signal pin 2 inserted into the attachment hole 20a might vibrate and the position thereof might be stable. Thus, the free end of each signal pin 2 is supported within the grooves 70a of the jig 70 and is them positioned. The free end is inserted into the attachment hole 20a with the free end of each signal pin 2 supported by the jig 70. Then, the jig 70 is pulled toward its side. Successively, the signal pin 2 is further inserted. After this, the back side of the board 20 is soldered to attach the connector 1 on the board 20. In the drawing, the numerous number 22 depicts the solder.

Figure 17:
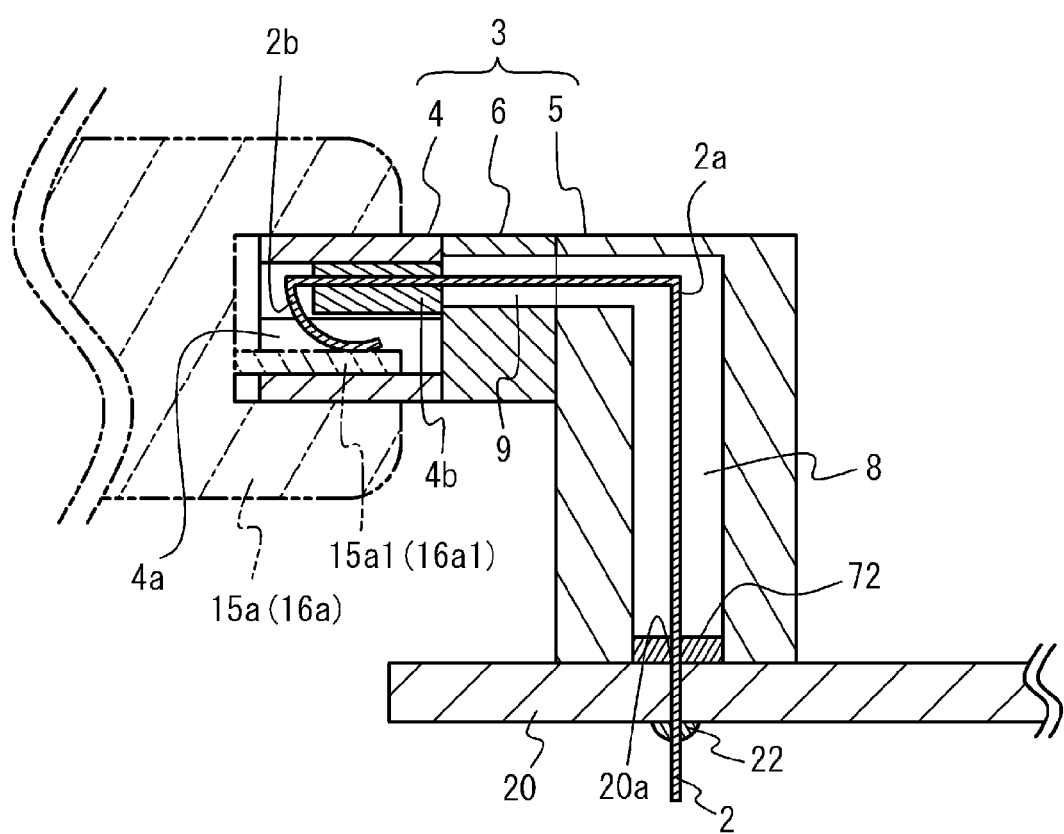
FIG. 17 is a cross-sectional view of a connector including a resin filled layer within a space defined within the rear end member.

In this way, the use of the jig 70 facilitates the mounting operation of the connector 1 on the board 20. To facilitate the mounting operation of the connector 1 to the board 20, a resin filled layer 72 may be provided at the lower edge of the rear end member 5. FIG. 17 is a cross-sectional view of the connector 1. The resin filled layer 72 is provided within the space 8 at the lower edge of the rear end member 5. This resin filled layer 72 supports the free end of the signal pin 2. This facilitates the positioning of the signal pin 2. Consequently, the jig 70 is not needed. Additionally, the resin filled layer 72 may be provided within all of the spaces 8, or only within a part of the space 8.

In this away, the board 20 attached with the connector 1 is arranged within the main chassis 101 of the notebook computer 100. Next, the board 20 is connected to the ODD 15 via the connector 1. Further, the board 20 is connected to the ODD 15 via the connector 1.

In cases where a speaker 21 sounds during use of the notebook computer 100, the board 20 might vibrate. Even when such vibration of the board 20 is generated, the connector 1 absorbs the vibration in the manner mentioned above. Thus, the transmission of the vibration to the ODD 15 is restricted. Consequently, the transmission of the vibration of the head of the ODD 15 is restricted. Further, the terminal 2b of the signal pin 2 is secured in the front end member 4 and the vibration of the ODD 15 is restricted, whereby the electrical conduction between the terminals 15a1 and 2b are stably maintained. This result restricts an error in reading or writing data in the ODD 15. Also, this result restricts an error in reading or writing data in the HDD 16 is restricted.

Conceivably, the reason why the board 20 vibrates has another factor such as falling of the notebook computer 100 or the vibration thereof in addition to the use of the speaker 21. Even when the vibration of the board 20 is generated due to another factor, the connector 1 according to the present embodiment can restrict an error in reading or writing data in the ODD 15 or in the HDD 16.

Although the embodiment of the present inventions has been described in detail, it should be understood that the various changes, substitutions, and alterations could be made hereto without departing from the spirit and scope of the invention.

In the above embodiment, the ODD 15 and the HDD 16 are exemplified as an electronic component. However, the connector 1 can be used for electrically conducting the board and another type of electronic component such as a Personal Computer Memory Card International Association (PCMCIA) card. Even in cases where the connector is used for such another type of electronic component, the electrical conduction between the board and the electronic component is also stably maintained.

The materials of the elastic member and the signal pin can be varied in light of the application of the connector. The material of the signal pin can be decided in light of its electrical conductivity or its elasticity.

In the above embodiment, the personal computer is exemplified as an electronic device. However, the connector 1 is applicable for another electronic device such as a DVD player, an audio player providing with a HDD, and the like.

What is claimed is:

1. A connector comprising:
   a signal pin provided at a front end thereof with a terminal contacting a terminal provided in an electronic component, and electrically conducting a board with the electronic component; and
   a housing that houses the signal pin,
   wherein the housing comprises:
      a front end member within which the signal pin is secured, and connected to a connector provided in the electronic component;
      a rear end member secured in the board, and defining a space within the rear end member; and
      an elastic member arranged between the front end member and the rear end member, having a block shape, and defining a space within the elastic member,
   wherein the signal pin is able to freely move within the spaces of the rear end member and the elastic member,
   wherein the space of the rear end member comprises:
      a first section extending in a direction intersecting a surface of the board; and
      a second section continuous with the first section and extending in a direction across the direction toward which the first section extends,
   wherein the space of the elastic member is continuous with the second section of the rear end member and extends in a direction identical to the direction toward which the second section extends.

2. The connector of claim 1, wherein the electronic component is a storage device accessing a storage medium rotated by a rotational mechanism, and reading or writing data in the storage medium.

3. The connector of claim 1, wherein the elastic member is made of any one of rubber, silicon, and sponge.

4. A board comprising a connector,
   a connector comprising:
      a signal pin provided at an end thereof with a terminal contacting a terminal provided in an electronic component, and electrically conducting a board with the electronic component; and
      a housing that houses the signal pin,
   wherein the housing comprises:
      a front end member within which the signal pin is secured, and connected to a connector provided in the electronic component;
      a rear end member secured in the board, and defining a space within the rear end member; and
      an elastic member arranged between the front end member and the rear end member, having a block shape, and defining a space within the elastic member,
   wherein the signal pin is able to freely move within the spaces of the rear end member and the elastic member,
   wherein the space of the rear end member comprises:
      a first section extending in a direction intersecting a surface of the board; and
      a second section continuous with the first section and extending in a direction across the direction toward which the first section extends,
   wherein the space of the elastic member is continuous with the second section of the rear end member and extends in a direction identical to the direction toward which the second section extends.

5. The board of claim 4, wherein the electronic component is a storage device accessing a storage medium rotated by a rotational mechanism, and reading or writing data in the storage medium.

6. The board of claim 4, wherein the elastic member is made of any one of rubber, silicon, and sponge.

7. An electronic device comprising:
   a connector comprising:
      a signal pin provided at a front end thereof with a terminal contacting a terminal provided in an electronic component, and electrically conducting a board with the electronic component; and
      a housing that houses the signal pin,
   wherein the housing comprises:
      a front end member within which the signal pin is secured, and connected to a connector provided in the electronic component;
      a rear end member secured in the board, and defining a space within the rear end member; and
      an elastic member arranged between the front end member and the rear end member, having a block shape, and defining a space within the elastic member;
   the electronic component is connected to the connector;
   the board; and
   a chassis housing the electronic component and the board, wherein the signal pin is able to freely move within the spaces of the rear end member and the elastic member, wherein the space of the rear end member comprises:
   a first section extending in a direction intersecting a surface of the board; and
   a second section continuous with the first section and extending in a direction across the direction toward which the first section extends, wherein the space of the elastic member is continuous with the second section of the rear end member and extends in a direction identical to the direction toward which the second section extends.

8. The electronic device of claim 7, wherein the electronic component is a storage device accessing a storage medium rotated by a rotational mechanism, and reading or writing data in the storage medium.

9. The electronic device of claim 7, wherein the elastic member is made of any one of rubber, silicon, and sponge.

10. The electronic device of claim 7, further comprising another electronic component vibrating and housed within the chassis.

* * * * *